US006647180B2

(12) United States Patent
Rothenberg

(10) Patent No.: US 6,647,180 B2
(45) Date of Patent: Nov. 11, 2003

(54) TUNABLE OPTICAL DISPERSION BY USING TWO FIBER BRAGG GRATINGS WITH NONLINEAR GROUP DELAYS

(75) Inventor: Joshua E. Rothenberg, San Jose, CA (US)

(73) Assignee: Teraxion Inc., Quebec (CA)

( * ) Notice: Subject to any disclaimer, the term of this patent is extended or adjusted under 35 U.S.C. 154(b) by 0 days.

(21) Appl. No.: 09/826,294

(22) Filed: Apr. 3, 2001

(65) Prior Publication Data

US 2002/0094165 A1 Jul. 18, 2002

Related U.S. Application Data

(60) Provisional application No. 60/234,465, filed on Sep. 21, 2000.

(51) Int. Cl.[7] .............................................. G02B 6/34
(52) U.S. Cl. .............................. 385/37; 385/11; 385/46; 359/130; 372/102
(58) Field of Search ........................ 385/37, 31, 24, 385/10, 11, 123, 46, 47, 48; 359/130, 161, 569, 572; 372/102, 6

(56) References Cited

U.S. PATENT DOCUMENTS

| | | | | |
|---|---|---|---|---|
| 5,982,963 A | * | 11/1999 | Feng et al. | 385/37 |
| 6,381,069 B1 | * | 4/2002 | Riant et al. | 359/569 |
| 6,400,869 B2 | * | 6/2002 | Pan et al. | 385/37 |
| 6,453,093 B2 | * | 9/2002 | Xie et al. | 385/37 |

FOREIGN PATENT DOCUMENTS

| | | |
|---|---|---|
| DE | 197 17 457 A | 10/1998 |
| EP | 00305007 | 3/2001 |
| EP | 1 081 881 A | 3/2001 |
| JP | 2000 028934 A | 1/2000 |
| WO | WO 0050944 | 8/2000 |

OTHER PUBLICATIONS

Fells, J.A.J., et al., "Twin Fiber Grating Tunable Dispersion Compensator," IEEE Photonics Technology Letters, vol. 13, No. 9, pp. 984–986, Sep. 2001.
Feced, Richard et. al, "An Efficient Inverse Scattering Algorithm for the Design of Nonuniform Fiber Bragg Gratings", IEEE Journal of Quantum Electronics, vol. 35., No. 8 (Aug. 1999) pp. 1105–1115.
PCT International Search Report dated Jan. 9, 2003 in International application No. PCT/US01/29182.
Pan Z et al., "Chirp–Free tunable PMD compensation using Hi–Bi nonlinearly–Chirped FBGs in a dual–pass configuration," Optical Fiber Communication Conference, Technical Digest Postconference Edition, Baltimore, MD, Mar. 7–10, 2000, New York, NY: IEEE, US vol. 3 of 4, pp. ThH2–1/113–ThH2–3/115, Mar. 7, 2000.
Feced R. et al, "An efficient inverse scattering algorithm for the design of nonuniform fiber Bragg gratings," IEEE Journal of Quantum Electronics, IEEE, USA, vol. 35, No. 8, pp. 1105–1115, Aug. 1999.
Quellette F., et al., "Broadband and WDM dispersion compensation using chirped sampled fibre Bragg gratings," Electronics Letters, IEE Stevenage, GB, vol. 31, No. 11, pp. 899–901, May 25, 1995.
Komukai T., et al., "Fabrication of non–linearly chirped fiber Bragg gratings for higher–order dispersion compensation," Optics Communications, North–Holland Publishing Co., Amsterdam, NL, vol. 154, No. 1–3, pp. 5–8, Aug. 15, 1998.

(List continued on next page.)

Primary Examiner—Phan T. H. Palmer
(74) Attorney, Agent, or Firm—Fulbright & Jaworski L.L.P.

(57) ABSTRACT

Techniques and designs for producing tunable optical dispersion by using two fiber Bragg gratings with nonlinear group delays to sequentially reflect an input optical signal and by tuning at least one of the fiber Bragg gratings.

111 Claims, 4 Drawing Sheets

OTHER PUBLICATIONS

Williams J A R, et al., "The design of in–fiber Bragg gratnig systems for cubic and quadratic dispersion compensation," Optics Communications, North–Holland Publishing Co., Amsterdam, NL, vol. 116, No. 1, pp. 62–66, Apr. 15, 1995.

Imai T. et al., "Second– and third–order dispersion compensation of picosecond pulses achieved by combining two nonlinearly chirped fibre Bragg gratings," Electronics Letters, IEE Stevenage, GB, vol. 34, No. 25, pp. 2422–2423, Dec. 10, 1998.

U.S. provisional application Ser. No. 60/234,465, Rothenberg, filed Sep. 21, 2000.

* cited by examiner

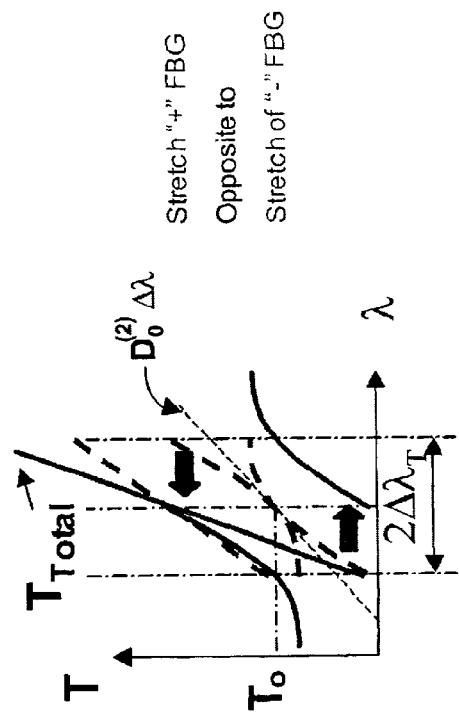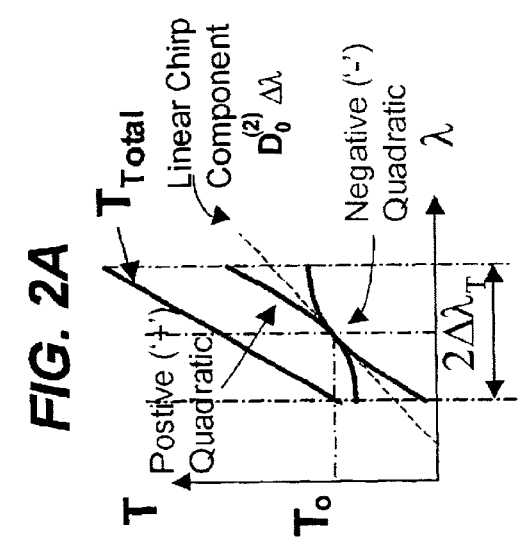
FIG. 2A
FIG. 2C
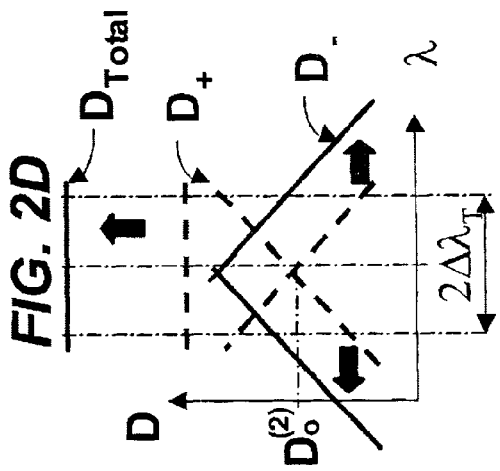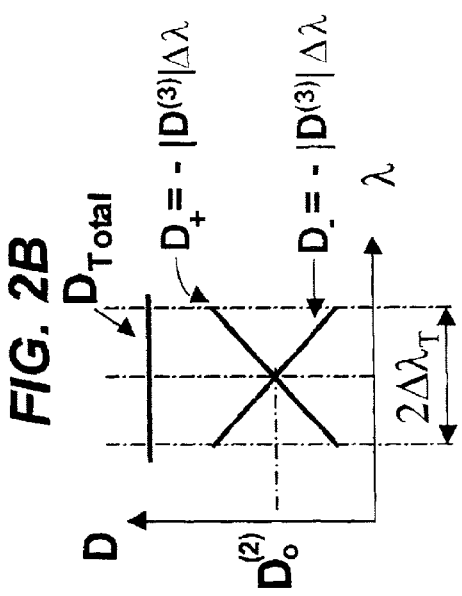
FIG. 2B
FIG. 2D

TUNABLE OPTICAL DISPERSION BY USING TWO FIBER BRAGG GRATINGS WITH NONLINEAR GROUP DELAYS

This application claims the benefit of U.S. Provisional Application No. 60/234,465, filed on Sep. 21, 2000.

TECHNICAL FIELD

This application relates to optical dispersion in optical materials, and more specifically, to techniques and systems for using tunable Bragg gratings for dispersion management and compensation.

BACKGROUND

Many optical fibers and other optical transmission media may exhibit various dispersion effects including the chromatic dispersion and the polarization mode dispersion (PMD). An optical pulse can be broadened or distorted after propagation through a distance in such a dispersive optical medium. These dispersion effects can be undesirable and even adverse for certain applications such as optical communication systems where information is encoded, processed, and transmitted in optical pulses. The pulse broadening caused by the dispersion can limit the transmission bit rate, the transmission bandwidth, and other performance factors of the optical communication systems.

Dispersion devices may be used to add artificially-controlled dispersion to the dispersion in the optical signal caused by the transmission medium to modify or control the total dispersion in an optical signal. In dispersion compensation applications, for example, a dispersion device may be designed to produce dispersion that substantially cancels the dispersion caused by the transmission medium. At a given location in an optical link, however, the dispersion in an optical signal may change over time due to factors such as fluctuations in the dispersion caused by variations in temperature or stress in a given optical path of the signal and changes in the physical path of the signal due to switching or routing operations of the nodes. Therefore, it may be desirable to dynamically tune such dispersion compensation or control in response to those and other changes in the dispersion.

One tunable dispersion device is a nonlinearly-chirped fiber Bragg grating (FBG). See, U.S. Pat. No. 5,982,963 to Feng et al. The nonlinearly-chirped Bragg grating is a grating formed along an optical waveguide, e.g., an optical fiber. The grating has a grating parameter $n_{eff}(z)\Lambda(z)$ that changes nonlinearly with the position z along the fiber optic axis, where $n_{eff}(z)$ is the effective index of refraction and $\Lambda(z)$ is the period of the grating. In operation, this nonlinearly-chirped grating reflects light satisfying a Bragg condition of $\lambda(z)=2n_{eff}(z)\Lambda(z)$ and transmits light that fails to satisfy the Bragg condition. Hence, different spectral components are reflected back at different positions in the grating to produce different group delays. A Bragg reflection band centered at a center wavelength $\lambda_0$ can be generated and the bandwidth, $\Delta\lambda_{FBG}$, of the grating is determined by the chirping range of the grating parameter $n_{eff}(z)\Lambda(z)$.

Notably, due to the nonlinearity in the chirp of the grating parameter $n_{eff}(z)\Lambda(z)$, the relative group delays for different spectral components vary nonlinearly as a function of wavelength in the nonlinearly-chirped fiber grating. The grating dispersion D at a particular wavelength, which is the slope of the curve representing the group delay as a function of wavelength, may be tuned by adjusting the grating parameter $n_{eff}(z)\Lambda(z)$. For example, the grating period $\Lambda(z)$ may be changed to tune the grating dispersion D by stretching or compressing the fiber grating.

The nonlinear group delay T in the wavelength domain produced by the grating in a reflected optical signal at λ may be generally expressed in the following polynomial expansion:

$$T=D_0^{(2)}(\lambda_0)(\lambda-\lambda_0)+D_0^{(3)}(\lambda_0)(\lambda-\lambda_0)^2/2+D_0^{(4)}(\lambda_0)(\lambda-\lambda_0)^3/6+\ldots \quad (1)$$

where $\lambda_0$ is the center wavelength of the Bragg reflection band of the grating, $D_0^{(2)}(\lambda_0)$ is a coefficient representing the second-order dispersion for which the group delay varies as a linear function of wavelength, $D_0^{(3)}(\lambda_0)$ is a coefficient representing the third-order dispersion for which the group delay varies as a quadratic function of wavelength, and $D_0^{(4)}(\lambda_0)$ is a coefficient representing the fourth-order dispersion for which the group delay varies as a cubic function of wavelength, and so on. The dispersion effects of the third order and higher orders are caused by the nonlinearity of the group delay generated by the spatial grating pattern. For simplicity, only the first two nonlinear terms are shown. The induced dispersion, D, produced by this grating can be represented by $$D = \frac{dT}{d\lambda} \quad (2)$$
$$= D_0^{(2)}(\lambda_0) + D_0^{(3)}(\lambda_0)(\lambda-\lambda_0) + D_0^{(4)}(\lambda-\lambda_0)^2/2 + \ldots$$

Hence, the $2^{nd}$, $3^{rd}$, and $4^{th}$ order dispersion terms lead to constant, linear, and quadratic variation in the dispersion with respect to the frequency detuning from the center of the Bragg reflection band, respectively. The corresponding rate of change in the induced dispersion in Eq. (2), i.e., the dispersion slope, of this nonlinearly-chirped fiber grating can be written as $$\text{Slope} = \frac{dD}{d\lambda} = D_0^{(3)}(\lambda_0) + D_0^{(4)}(\lambda-\lambda_0) + \ldots \quad (3)$$

Hence, the grating dispersion D in the nonlinearly-chirped FBG is a function of the frequency detuning, i.e., the relative spectral position of the wavelength λ of the input optical signal with respect to the center wavelength $\lambda_0$ of the Bragg reflection band.

Therefore, spectral components in an optical signal at different input wavelengths are located at different spectral positions with respect to the center wavelength and hence experience different grating dispersions upon being reflected by the grating. In addition, the grating dispersion D at each given input wavelength may be tuned by changing the grating parameter $n_{eff}(z)\Lambda(z)$ to shift the center wavelength $\lambda_0$ of the Bragg reflection band and hence the dispersion curve with respect to the input wavelength. For example, the total length of the fiber grating may be changed by using a fiber stretcher to adjust $\Lambda(z)$ in order to shift the center wavelength $\lambda_0$. This capability in tuning the grating dispersion can be used to control or compensate for dispersion in an optical signal after transmitting through an optical link with a time-varying dispersion.

SUMMARY

The present disclosure includes techniques and fiber systems that use two fiber Bragg gratings as a pair to produce a tunable grating dispersion in an input optical signal. Each fiber Bragg grating is designed to have a spatial grating pattern that produces a nonlinear group delay with respect to the frequency detuning of the input optical signal from the center wavelength of a Bragg reflection band. At least one of the two gratings is tunable. In one embodiment, such a pair of tunable fiber Bragg gratings may be arranged in various configurations to produce a tunable grating dispersion based on nonlinear dispersion effects from the two gratings without exhibiting a net nonlinear dispersion effect. The spatial grating patterns of the two fiber Bragg gratings, such as nonlinear spatial chirps in nonlinearly-chirped gratings, may also be configured so that the grating dispersion and grating dispersion slope may be separately adjusted in a nearly independent manner.

BRIEF DESCRIPTION OF THE DRAWINGS

FIGS. 2A, 2B, 2C, and 2D illustrate the design and operation of a grating pair with two tunable FBGs for producing tunable grating dispersion with substantially canceled nonlinear grating dispersion.

DETAILED DESCRIPTION

The techniques and devices described in this application use fiber Bragg gratings with spatial grating patterns to produce a group delay as a nonlinear function of the wavelength of light. Nonlinear chirping in the grating parameter $n_{eff}(z)\Lambda(z)$ provides one example of such fiber Bragg gratings. The nonlinearity in the group delay may be used to produce the desirable and beneficial tunable dispersion. In addition, the nonlinearity in the group delay may also be used to tune the dispersion slope produced by a sampled grating with multi-channel Bragg reflection bands, i.e., a change in the induced dispersion from one channel to an adjacent channel in WDM systems. However, such nonlinearity may also lead to pulse distortion in the optical pulses reflected by the grating. One consequence of this pulse distortion is a power penalty at an optical receiver. This pulse distortion and associated power penalty generally increase with the bit rate of the data stream.

Figure 1A:
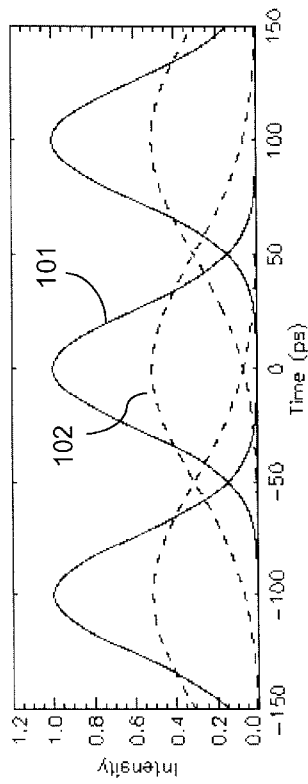
FIGS. 1A, 1B, and 1C show simulated effects of the nonlinear grating dispersion by a tunable fiber Bragg grating in dispersive fiber links.
Figure 1B:
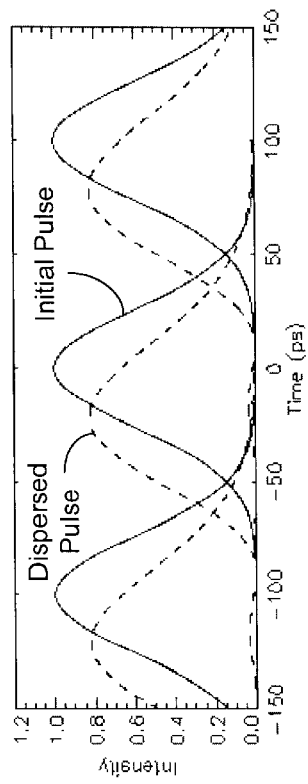
Figure 1C:
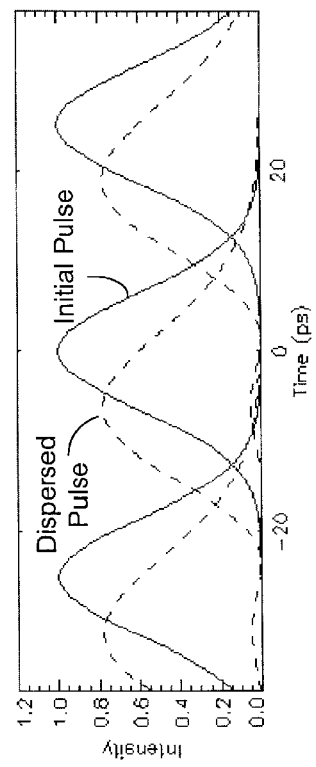

FIGS. 1A, 1B, and 1C show simulated effects of such nonlinear dispersion on a single Gaussian pulse reflected by a nonlinearly-chirped fiber Bragg grating. The nonlinear chirp of the fiber Bragg grating is designed to have the third-order nonlinear dispersion $D_0^{(3)}(\lambda_0)$ but no other higher order effects. The single pulse results at different times based on a linear dispersion calculation are shifted in time and plotted together to give the appearance of an eye diagram plot. The simulation assumes that, the pulse propagates through a 100-km fiber link with a dispersion of 17 ps/nm-km, and that the pulse is a transform-limited Gaussian pulse in the return-to-zero (RZ) format with intensity FWHM of 60 ps for OC-192 (10 Gb/s) and 15 ps for OC-768 (40 Gb/s), respectively. The dispersion for the nonlinearly-chirped grating is assumed to be $$D(\lambda) = -1000 \ ps/nm + D^{(3)}(\lambda - \lambda_o),$$

where $D^{(3)}$ is assumed to be 1000 ps/nm². Hence, the value of $D^{(3)}(\lambda - \lambda_o)$ should vary over ±1000 ps/nm in order to produce a tunable grating dispersion from 0 to −2000 ps/nm. Assuming the nominal dispersion value for standard communication fibers is about +17 ps/nm-km, this fiber grating can be used to compensate for dispersion in a fiber link of up to about 118 km in length.

In FIG. 1A, the solid curve 101 represents the OC-192 pulse at the beginning of the dispersive link, the dashed curve 102 represents the pulse shape after transmitting through the dispersive link with a total dispersion of $D^{(2)} = 1700$ ps/nm, without the dispersion compensation. When the fiber grating is used to compensate for the dispersion, the pulse shape after compensation essentially overlaps with the solid curve 101. Hence, at bit rates below 10Gb/s (OC-192), this pulse distortion is relatively small for a single fiber link of about 100 km but can become significantly large over a longer fiber link.

FIG. 1B shows the distorted pulse shape at 10 Gb/s (OC-192) after transmitting through a fiber link of 5000 km in length. The distortion of the pulses in FIG. 1B is primarily a result of the fact that the dispersion of the pulse is compensated by using the above grating every 100 km in the fiber link. Since the third-order dispersion by the grating is about 1000 ps/nm² per link, a total of 50000 ps/nm² in the third-order dispersion is accumulated. FIG. 1C further shows that, a pulse at 40 Gb/s (OC-768) can be significantly distorted after transmitting through a single 100-km fiber link even with the dispersion compensation of a single fiber grating with a third-order dispersion of 1000 ps/nm². Hence, the third-order dispersion produced by the nonlinear-chirped fiber grating may be problematic for optical links at high bit rates.

One aspect of the present disclosure is to use two specially-designed tunable fiber Bragg gratings as a pair to mitigate the above pulse distortion and power penalty by minimizing the net third-order dispersion in the optical signal after being reflected by both of the gratings. Each fiber Bragg grating is designed to have a spatial grating pattern that produces a nonlinear group delay with respect to the frequency detuning of the input optical signal from the center wavelength of a Bragg reflection band. One implementation of such gratings, for example, is the aforementioned nonlinearly-chirped fiber Bragg gratings. When the two gratings are configured under proper conditions, the operation of the grating pair can produce a total delay as a linear function of the input wavelength over the bandwidth of the Bragg reflection band. The nonlinear group delay in each individual grating, including the third-order dispersion, is still desirable for providing the tunability of the total grating dispersion produced by the grating pair so that either or both of the gratings in the grating pair may be tuned to adjust the total grating dispersion.

Consider a grating pair in which each nonlinearly-chirped fiber Bragg grating exhibits the constant dispersion term $D_0^{(2)}(\lambda_0)$ and only the first higher-order dispersion term, the third order $D_0^{(3)}(\lambda_0)(\lambda - \lambda_0)$ which is a linear function of wavelength. The nonlinear chirp patterns in the grating parameter $n_{eff}(z)\Lambda(z)$ of the two gratings are designed to make their third-order dispersion coefficients $D_0^{(3)}(\lambda_0)$ to have opposite signs: the grating with a positive $D_0^{(3)}(\lambda_0)$ is designated as "+" and the other grating with a negative $D_0^{(3)}(\lambda_0)$ is designated as "−". Assuming the respective center wavelengths of the Bragg reflection bands of the two gratings are $\lambda_{o+}$ and $\lambda_{o-}$, the grating dispersions of the gratings can be respectively expressed as $$D_+ = D_+^{(2)}(\lambda_0) + D_+^{(3)}(\lambda_0)\Delta\lambda_+, \tag{4}$$

$$D_- = D_-^{(2)}(\lambda_0) + D_-^{(3)}(\lambda_0)\Delta\lambda_-, \tag{5}$$

where $\Delta\lambda_+ = \lambda - \lambda_{o+}$ and $\Delta\lambda_- = \lambda - \lambda_{o-}$ are detuning values from the center wavelength for each of the two gratings. These center wavelengths can be independently adjusted by, for example, stretching or compressing each grating. In one implementation, the third-order dispersion coefficients can be chosen to have opposite values: $D_+^{(3)}(\lambda_0)=-D_-^{(3)}(\lambda_0)$. Under this condition, the total grating dispersion produced by the grating pair is $$D = D_+ + D_- = D_+^{(2)}(\lambda_0) + D_-^{(2)}(\lambda_0) + D_+^{(3)}(\lambda_0)(\Delta\lambda_+ - \Delta\lambda_-), \quad (6)$$
$$= D_+^{(2)}(\lambda_0) + D_-^{(2)}(\lambda_0) + D_+^{(3)}(\lambda_0)(\lambda_{0-} - \lambda_{0+}) + D_+^{(3)}(\lambda_0)(\lambda - \lambda).$$

Therefore, the last term, representing the third-order dispersion term in the total combined dispersion of the two gratings, is identically zero; whereas the stretching or compression of the two gratings can tune the dispersion values of the gratings at their center wavelengths, $\lambda_{o+}$ and $\lambda_{o-}$. Thus, this can change the dispersion D through the term $D_+^{(3)}(\lambda_0)(\lambda_{0-}-\lambda_{0+})$. Notably, under the above conditions, the two grating center wavelengths should be tuned in opposite directions from their initial values to achieve the full dispersion range. When only one of the two gratings is tunable, the total induced dispersion by the grating pair is still tunable but the tuning range is one half of the tuning range achievable when both gratings are tunable.

FIGS. 2A, 2B, 2C, and 2D illustrate the design and operation of the above grating pair where $D_+^{(3)}(\lambda_0)=-D_-^{(3)}(\lambda_0)$. FIG. 2A shows the delays produced by the two gratings and the total delay as a function of the relative wavelength $\lambda$ of the input wavelength with respect to the center wavelength of the Bragg reflection band. FIG. 2B shows the grating dispersions and the total dispersion of the grating pair. FIGS. 2C and 2D illustrate the changes in delays and dispersions when the "+" grating is compressed and the "−" grating is stretched by the same amount to increase the total relative delay between different wavelengths and the total dispersion. Conversely, the "+" grating can be stretched and the "−" grating can be compressed by the same amount to reduce the total relative delay between different wavelengths and the total dispersion.

Alternatively, the two gratings may be designed to have unequal magnitudes of $D_+^{(3)}(\lambda_0)$ and $D_-^{(3)}(\lambda_0)$. Under this condition, the two gratings may also be stretched or compressed by different amounts to produce a desired, tunable amount of the constant dispersion term represented by the dispersion coefficients $(D_+^{(2)}(\lambda_0)+D_-^{(2)}(\lambda_0))$ in Eq. (6). In addition, $D_+^{(3)}(\lambda_0)$ and $D_-^{(3)}(\lambda_0)$ may be selected so that the total dispersion includes a residual, fixed third-order nonlinear dispersion which may be used to compensate for the intrinsic third-order dispersion of the fiber, typically at about 5–10 ps/nm² for a 100-km link. It may also be desirable to tune the third-order dispersion for dispersion slope compensation by designing the gratings to have the fourth-order dispersion term in Eq.(1) as discussed further below.

Figure 3:
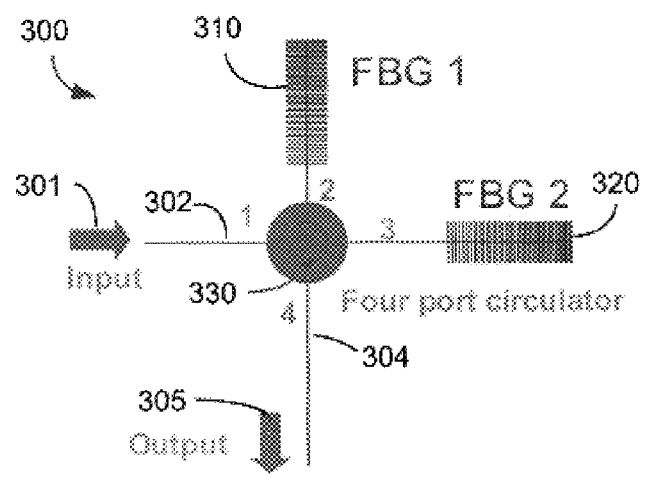
FIGS. 3, 4, 5, and 6 show exemplary configurations of grating pairs according to the present invention.

FIG. 3 shows a cascade grating pair 300 with two fiber Bragg gratings 310 and 320 operable to produce nonlinear group delays according to one embodiment. The gratings 310 and 320 may be nonlinearly-chirped gratings. As described above, the sign of the third-order nonlinear dispersion coefficient $D_0^{(3)}(\lambda_0)$ of the first grating 310 is opposite to that of the second grating 320. A four-port optical circulator 330 is used to couple light from an input fiber 302 to the first grating 310, from the first grating 310 to the second grating 320, and from the second grating 320 to an output fiber 304. Each grating is oriented to have the long-wavelength end, where the grating spacing is greatest, to receive the light from the circulator 330. An input signal 301 enters the grating pair 300 by first being reflected by the grating 310 and then being reflected by the grating 320 to produce an output signal 305.

In one implementation, each of the gratings 310 and 320 in the grating pair 300 may be coupled to a designated grating stretcher so that both gratings 310 and 320 are independently tunable. Assume the grating 310 has the positive third-order dispersion coefficient $D_+^{(3)}(\lambda_0)$ and the grating 320 has the negative coefficient $D_-^{(3)}(\lambda_0)$. When $D_+^{(3)}(\lambda_0)=-D_-^{(3)}(\lambda_0)$, both gratings 310 and 320 can be stretched by an amount to produce dispersion at the midpoint of their tuning range. This sets the initial setting of the grating pair 300, and the net $3^{rd}$ order dispersion is zero. In operation, the total grating dispersion on the output signal 305 can be increased by stretching the grating 310 while relaxing the grating 320 by the same amount. When the total grating dispersion is to be reduced, the grating 320 is stretched and the grating 310 is relaxed, both by the same amount. Such tuning operations allow the grating pair 300 to operate at its full dispersion range, while maintaining zero net $3^{rd}$ order dispersion.

Alternatively, the grating pair 300 may be tuned by tuning only one of the gratings 310 and 320 while the other grating is fixed at a selected length. This configuration can be used to reduce the mechanical complexity of the system, since only one stretching device is required, while still maintaining cancellation of the third-order dispersion terms between the two gratings so that the net grating dispersion is constant and independent of wavelength. Assuming only the grating 310 is tunable, $D_+^{(3)}(\lambda_0)=-D_-^{(3)}(\lambda_0)$, the grating 310 can be initially stretched to produce a grating dispersion at the midpoint of its tuning range. In operation, the grating 310 is stretched to increase the total grating dispersion and is relaxed to reduce the total grating dispersion.

The grating pair 300 may be periodically deployed in a fiber line to compensate for chromatic dispersion. The spacing between two adjacent grating pairs is selected such as the dispersion accumulated in the fiber link over the selected spacing is within the compensation range of each grating pair. In this configuration, the two gratings in each pair are coupled to a common point in the fiber link and the dispersion in the output signal of each grating pair is essentially fully compensated.

Figure 4:
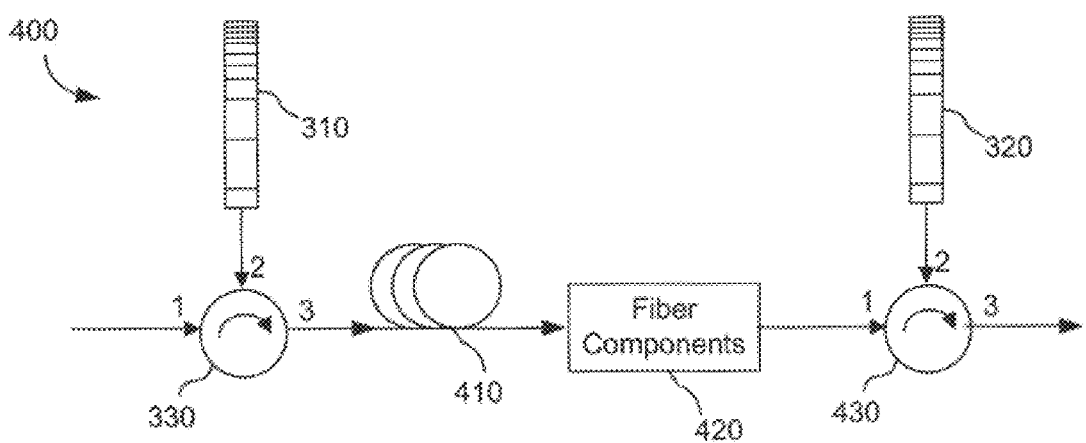

FIG. 4 shows another configuration 400 for implementing two fiber Bragg gratings 310 and 320 with nonlinear group delays as a grating pair in two different locations in a fiber. The first grating 310 is disposed at one end of a dispersive fiber link 410 and the second fiber grating 320 is disposed at the opposite end. Optical circulators 330 and 430 are used to respectively couple the fiber gratings 310 and 320 to the fiber link 410. The fiber link 410 may include one or more fiber components 420 between the two gratings 310 and 320. This configuration, like the cascade configuration shown in FIG. 3, can substantially cancel the third-order nonlinear dispersion. Unlike the system 300 in FIG. 3 where the signal is fully compensated at the beginning of each link, the signal in the system 400 is fully compensated at the beginning of every other link.

This configuration has the advantage that only one grating is introduced for each link. The total number of the gratings is less than that of the cascaded scheme shown in FIG. 3 and hence the accumulated power loss introduced by the gratings throughout the transmission system can be reduced. Assuming that the gratings in FIG. 4 have similar loss to those used in FIG. 3, the grating loss would be reduced by a factor of two per link in the configuration of FIG. 4, while still operable to cancel out the accumulated higher-order dispersion in the transmission system.

Figure 5:
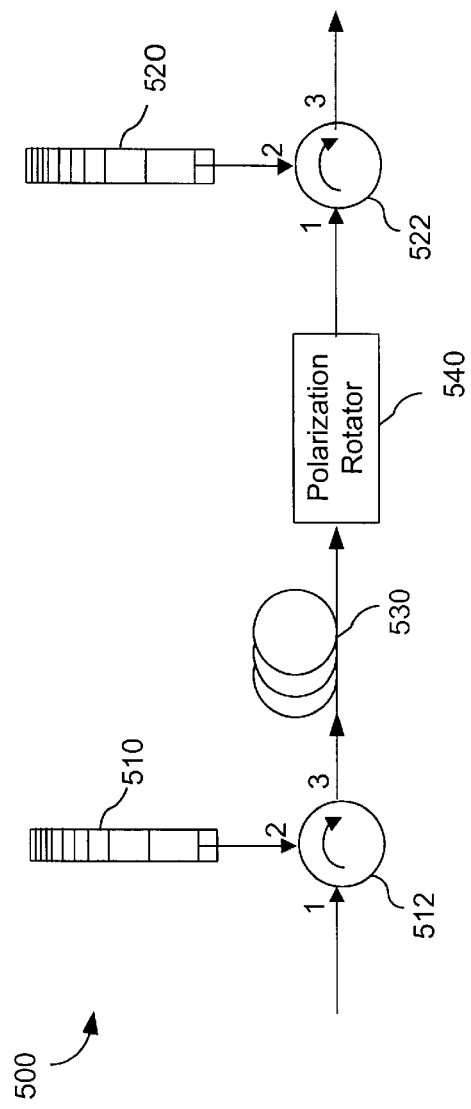
Figure 6:
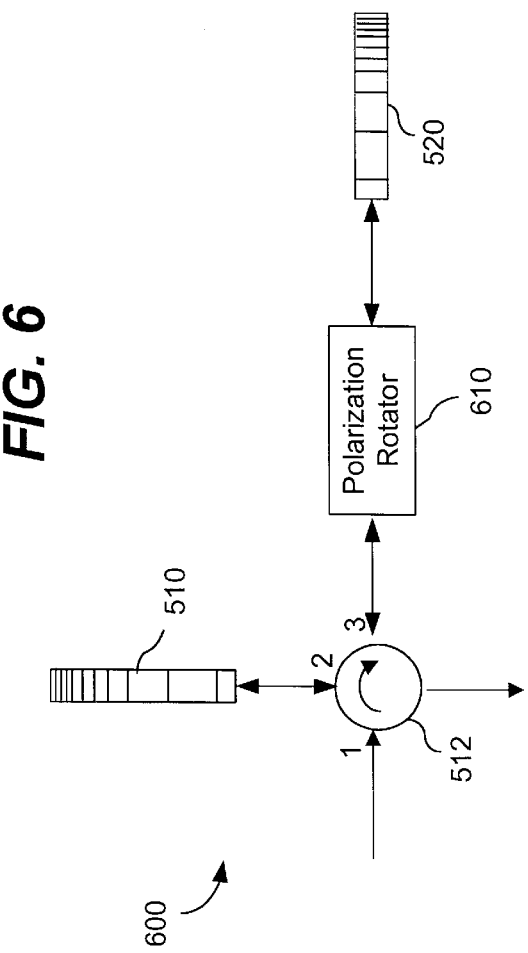

FIGS. 5 and 6 show grating pairs formed of birefringent nonlinearly-chirped fiber gratings 510 and 520 or gratings with nonlinear group delays for compensating or controlling polarization-mode dispersion (PMD). A polarization rotator 540 or 610, such as a polarization controller, is disposed in the optical path from the grating 510 to the grating 520 to rotate the polarization of light. The principal axes of polarization of the gratings 510 and 520 are arranged so that the polarization along the fast axis of the grating 510 is rotated to polarize along the slow axis of the grating 520 and the polarization along the slow axis of the grating 510 is rotated to polarize along the fast axis of the grating 520. The systems 500 and 600 can compensate for first order and second order PMD while minimizing the higher-order chromatic dispersion caused by the nonlinear chirps in the gratings 510 and 520.

In the system 500 in FIG. 5, the two gratings are located at the opposite ends of the fiber link 530 which may have PMD that fluctuates with time. Hence, the polarization rotator 540 may be the adjustable type to maintain the above desired polarization condition. The rotator 540 may be located near the coupler 522 to reduce the perturbation in the output polarization from the rotator 540 by the fiber link 530. In FIG. 6, the polarization rotator 610 may be designed to rotate the polarization by 90 degrees since both gratings 510 and 520 are at the same location of a link. Alternatively, the system 600 may eliminate the rotator 610 by arranging the orientations of the gratings 510 and 520 so that principal axes of polarization of the grating 510 are rotated 90 degrees with respect to those of the grating 520.

The polarization rotator 540 or 610 may also be used so that the polarization along the fast axis of the grating 510 is rotated by an amount less than an angle to polarize along the slow axis of the grating 520 and the amount of the polarization rotation is used control the amount of PMD in the output signal from the grating pair. Certainly, in this context, the polarization rotator 540 or 610 may be eliminated by orienting the principal axes of the gratings 510 and 520 at a desired angle to control the amount of PMD in the output signal from the grating pair.

In each of above twin-grating configurations, the two fiber Bragg gratings with nonlinear group delays may also be designed to exhibit an additional higher-order dispersion term, the fourth-order dispersion $D^{(4)}$, in addition to the third-order dispersion term $D^{(3)}$. Such a grating pair allows for separate adjustments of the grating dispersion and the rate of change in the grating dispersion with respect to wavelength (i.e., grating dispersion slope). The following describes the designs and operations of several examples of such grating pairs.

The dispersions of the two generally distinct FBGs may be written as follows:

$$D_1^{(2)}(\lambda) = D_{01}^{(2)} + D_{01}^{(3)}\lambda + D_1^{(4)}\lambda^2/2 \qquad (7)$$

$$D_2^{(2)}(\lambda) = D_{02}^{(2)} + D_{02}^{(3)}\lambda + D_2^{(4)}\lambda^2/2 \qquad (8)$$

where the wavelength $\lambda$ is measured relative to a center wavelength of the respective Bragg reflection band. Assume each grating can be independently tuned by uniform stretching or compressing. Such tuning can be used to independently shift the effective center wavelength of the Bragg reflection band of each grating so that the dispersion at the operating wavelength is adjustable according to the following functions:

$$D_1^{(2)}(\lambda) = D_{01}^{(2)} + D_{01}^{(3)}(\lambda+\lambda_1) + D_1^{(4)}(\lambda+\lambda_1)^2/2, \text{ and} \qquad (9)$$

$$D_2^{(2)}(\lambda) = D_{02}^{(2)} + D_{02}^{(3)}(\lambda+\lambda_2) + D_2^{(4)}(\lambda+\lambda_2)^2/2, \qquad (10)$$

where $\lambda_1$ and $\lambda_2$ are the shifts in their respective center wavelengths of the gratings from the stretches. Such stretches may be generally independent and unequal. In particular, the wavelength shifts $\lambda_1$ and $\lambda_2$ can be represented by the following:

$$\lambda_1 = \lambda_p + \lambda_n, \text{ and} \qquad (11)$$

$$\lambda_2 = \lambda_p - \lambda_n, \qquad (12)$$

where $\lambda_p$ is the portion of the shift in the same direction in both FBGs by simultaneously stretching or compressing both FBGs, and $\lambda_n$ is the portion of the shift in opposite directions in the two FBGs by stretching one FBG while compressing the other FBG. That is, $\lambda_p$ is associated with a symmetric stretching or compression of the two gratings while $\lambda_n$ is associated with an anti-symmetric stretch or compression of the two gratings.

In order to independently tune both the $D^{(3)}$ and $D^{(2)}$, the gratings are designed such that the fourth order coefficients $D_{01}^{(4)}$ and $D_{02}^{(4)}$ are equal and have opposite signs and the third order coefficients $D_{01}^{(3)}$ and $D_{02}^{(3)}$ are equal and of the same sign. This design can not only cancel out the fourth-order dispersion in the net grating dispersion of the two grating dispersions but also allow for the effect of $\lambda_n$ and $\lambda_p$ to act nearly independently on $D^{(3)}$ and $D^{(2)}$. The net grating dispersion of the two FBGs as the sum of Eqs. (9) and (10) can be expressed as:

$$D^{(2)}(\lambda) = D_0^{(2)} + D_0^{(3)}(2\lambda+\lambda_1+\lambda_2) + D_0^{(4)}((\lambda+\lambda_1)^2 - (\lambda+\lambda_2)^2)/2 \qquad (13)$$

where the sum of $D_{01}^{(2)}$ and $D_{02}^{(2)}$ has been abbreviated as $D_0^{(2)}$, $D_0^{(3)} = D_{01}^{(3)} = D_{02}^{(3)}$, and $D_0^{(4)} = D_1^{(4)} = -D_2^{(4)}$. Substituting Eqs. (11) and (12) into Eq. (13) yields $$\begin{aligned}D^{(2)}(\lambda) &= D_0^{(2)} + 2D_0^{(3)}(\lambda+\lambda_p) + 2D_0^{(4)}\lambda_n(\lambda+\lambda_p) \\ &= D_0^{(2)} + (2D_0^{(3)} + 2D_0^{(4)}\lambda_n)(\lambda+\lambda_p)\end{aligned} \qquad (14)$$

Hence, the total effective dispersion at the operating wavelength where $\lambda=0$ is given by $$D^{(2)}(0) = D_0^{(2)} + (2D_0^{(3)} + 2D_0^{(4)}\lambda_n)\lambda_p. \qquad (15)$$

The expression in the parentheses in Eq. (15) is the total effective third-order dispersion at $\lambda=0$ that represents the rate of change in the dispersion with respect to the wavelength, i.e., the dispersion slope:

$$D^{(3)}(0) = 2D_0^{(3)} + 2D_0^{(4)}\lambda_n \qquad (16)$$

Eqs. (14)–(16) suggest that, $\lambda_n$ can be adjusted to tune $D^{(3)}$ and $\lambda_p$ can be adjusted to tune $D^{(2)}$. The adjustment in $\lambda_n$ changes not only the value of $D^{(3)}$ but also the value of $D^{(2)}$ since it is dependent on the value of $D^{(3)}$ and hence $\lambda_n$. Despite such interdependency, the above symmetric and anti-symmetric stretching or compression of the properly-chirped fiber gratings can provide separate tuning mechanisms for the net grating dispersion and the grating dispersion slope.

Notably, the above symmetric and anti-symmetric stretching or compression of the properly-designed fiber gratings, e.g., proper nonlinear chirping, may be used to separately tune the dispersion and dispersion slope in multiple optical channels that are evenly spaced from one another as in a WDM system. Each fiber Bragg grating in the grating pair may be sampled by a spatial sampling pattern to produce multiple evenly-spaced Bragg reflection bands centered at different wavelengths. The sampling period P is selected to be greater than the underlying grating period. Such a sampled grating with a nonlinear group delay can be used to provide simultaneous and tunable dispersion compensation in multiple WDM channels. See, PCT publication No. WO0050944 by Cai et al. and U.S. patent application Ser. No. 09/253,645 filed on Feb. 19, 1999.

In particular, the sampling period P is designed such that the grating channel spacing is slightly offset by an incremental wavelength $\delta$ from the ITU grid spacing between adjacent channels in a WDM signal. Thus, N channels away from the center channel of the band, the wavelength offset accumulates to a value of $N\delta$. Therefore, if both FBGs are designed to have the same offset $\delta_p$ in wavelength with the same sign, the dispersion of the Nth channel is given by Eq. (14), $$D^{(2)}(0+N\delta)=D_0^{(2)}+(2D_0^{(3)}+2D_0^{(4)}\lambda_n)(\lambda_p+N\delta_p) \quad (17)$$

Thus, the variation or change in dispersion from one channel to an adjacent channel (i.e., dispersion slope) produced by each grating is given by the change in dispersion divided by the wavelength separation of the Nth channel, i.e., $$s=\Delta D^{(2)}/\Delta\lambda=(2D_0^{(3)}+2D_0^{(4)}\lambda_n)(\delta_p/\lambda_{ch}) \quad (18)$$

where $\lambda_{ch}$ is the separation between two adjacent channels. For a sampled grating having an effective average group index $n_g=n_{eff}-\lambda_0 dn_{eff}/d\lambda|_{\lambda=\lambda_0}$, the channel spacing is $\lambda_{ch}=\lambda_0^2/2n_g P$.

Eqs. (15)–(18) suggest that both the dispersion and the slope of the dispersion are now tunable. According to Eq. (16), changing an asymmetric stretch of the two gratings $\lambda_n$ tunes the central value of $D^{(3)}$ and thus, as shown in Eq. (18), the slope of the dispersion over many channels. Equation (15) shows that for a given value of $D^{(3)}$ (and $\lambda_n$), changing $\lambda_p$ by a symmetric stretch tunes the central value of dispersion. Thus, although not completely independent, it is now possible to tune both the dispersion and dispersion slope by proper values of $\lambda_n$ and $\lambda_p$. The proper amounts of stretches, $\lambda_1$ and $\lambda_2$, for the two gratings may be determined by Eqs. (11) and (12) with the values of $\lambda_n$ and $\lambda_p$.

The dispersion tuning by using the grating pair under the analysis of Eqs. (14)–(18) is fully applicable when only one of the two gratings is tunable by, e.g., being stretched or compressed. In this case, assume, for example, that the second grating is not stretched or compressed, i.e. $\lambda_2=0$. Eqs. (11) and (12) provide that $\lambda_p=\lambda_n=\lambda_1/2$. These values for $\lambda_p$ and $\lambda_n$ can be substituted into Eqs. (14)–(18) to find that $D^{(2)}$, $D^{(3)}$, and the WDM slope defined in Eq.(18), i.e., change in the total induced dispersion from one channel to an adjacent channel when two gratings are sampled, can all be tuned by the stretching or compression of a single grating, albeit not independently. This embodiment may be used in applications where only a single stretching or compression mechanism is desired. The stretching or compression of a single grating in the grating pair may be used in other designs of the grating pair disclosed in this application.

In the above scheme, the signs of $D^{(3)}$ are the same in both gratings. As a result, the third-order dispersions of the two gratings add up to produce a net third-order dispersion. For some applications, the third-order dispersion may be undesirable. Hence, alternative to the above scheme, the gratings may be designed to have the opposite signs for both $D^{(3)}$ and $D^{(4)}$ coefficients to cancel the third-order dispersion in the net dispersion produced by the grating pair. Under this design, the net grating dispersion produced by the grating pair can be written as:

$$D^{(2)}(\lambda)=D_0^{(2)}+D_0^{(3)}(\lambda_1-\lambda_2)+D_0^{(4)}((\lambda+\lambda_1)^2-(\lambda+\lambda_2)^2)/2. \quad (19)$$

Substituting Eqs. (11) and (12) into Eq.(19) yields $$D^{(2)}(\lambda) = D_0^{(2)} + 2D_0^{(3)}\lambda_n + 2D_0^{(4)}\lambda_n(\lambda + \lambda_p) \quad (20)$$
$$= D_0^{(2)} + (2D_0^{(3)} + 2D_0^{(4)}(\lambda + \lambda_p))\lambda_n$$

Hence, the total effective dispersion at the operating wavelength where $\lambda=0$ is given by $$D^{(2)}(0)=D_0^{(2)}+(2D_0^{(3)}+2D_0^{(4)}\lambda_p)\lambda_n. \quad (21)$$

The total effective third-order dispersion can be computed by the derivative of Eq. (20) with respect to $\lambda$, $$D^{(3)}(\lambda)=2D_0^{(4)}\lambda_n \quad (22)$$

Therefore, in the absence of the anti-symmetric stretching or compression ($\lambda_n=0$), the effective third-order dispersion is essentially zero. Similar to the above scheme, the two sampled gratings are designed to have the same frequency offset $\delta_n$ between the frequency spacing of the Bragg reflection bands produced by each sampled grating and the input channel spacing of the WDM signals on the ITU grid. Different from the above scheme, the frequency offsets in the two sampled gratings have opposite signs. Under this condition, the effective dispersion of the Nth channel from the band center produced by the two gratings is $$D_1^{(2)}(0+N\delta_n)+D_2^{(2)}(0-N\delta_n)=D_0^{(2)}+(2D_0^{(3)}+2D_0^{(4)}\lambda_p)(\lambda_n+N\delta_n), \quad (23)$$

and the associated dispersion slope produced by the two gratings is $$s=\Delta D^{(2)}/\Delta\lambda=(2D_0^{(3)}+2D_0^{(4)}\lambda_p)(\delta_n/\lambda_{ch}). \quad (24)$$

According to Eqs. (21)–(24), the anti-symmetric stretch $\lambda_n$ tunes the total effective dispersion of the two gratings, although the rate of tuning will depend on the symmetric stretch $\lambda_p$. In addition, the $3^{rd}$ order dispersion is zero when $\lambda_n=0$, but varies with $\lambda_n$ according to Eq. (22). Applying the symmetric stretch $\lambda_p$ changes the dispersion slope according to Eq. (24), when the incremental channel spacing offset $\pm\delta_n$ is designed to be of opposite signs in the two gratings. If $\lambda_n=0$, the dispersion slope is tuned by changing $\lambda_p$ without varying the second-order dispersion or introducing any $3^{rd}$ order dispersion. Thus, this arrangement may be preferred in some applications because it can independently tune the dispersion slope without introducing any other adverse effects.

The above description discloses two possibilities for the signs of $D^{(3)}$ and $D^{(4)}$ in designing the grating pair with two nonlinearly-chirped fiber Bragg gratings. Two additional possibilities are cases where both gratings have the same sign in their $D^{(4)}$ coefficients, and their $D^{(3)}$ coefficients have either the same or opposite signs. If the $D^{(4)}$ have the same sign, the quadratic terms in Eqs. (15) and (16) do not cancel out. Such arrangements may be advantageous in some applications.

Consider the case where both $D^{(3)}$ and $D^{(4)}$ have the same sign in both gratings. The total dispersion of the two gratings is $$D^{(2)}(\lambda)=D_0^{(2)}+D_0^{(3)}(2\lambda+\lambda_1+\lambda_2)+D_0^{(4)}((\lambda+\lambda_1)^2+(\lambda+\lambda_2)^2)/2 \quad (25)$$

Substitution of Eqs. (11) and (12) into Eq. (25) yields $$D^{(2)}(\lambda)=D_0^{(2)}+2D_0^{(3)}(\lambda+\lambda_p)+D_0^{(4)}(\lambda^2+\lambda_n^2+\lambda_p^2+2\lambda\lambda_p) \quad (26)$$

The dispersion at band center ($\lambda=0$) is $$D^{(2)}(0)=D_0^{(2)}+2D_0^{(3)}\lambda_p+D_0^{(4)}(\lambda_n^2+\lambda_p^2) \quad (27)$$

Thus the total dispersion may be tuned by adjusting $\lambda_p$, but there are also components quadratic in $\lambda_p$ and $\lambda_n$. The third order dispersion is given by $$D^{(3)}(\lambda)=2D_0^{(3)}+2D_0^{(4)}(\lambda+\lambda_p). \quad (28)$$

Assume the two fiber gratings are sampled and have opposite sign offsets $\pm\delta_n$, with respect to the input WDM channels. The dispersion of the Nth channel is given by $$D_1^{(2)}(0+N\delta_n)+D_2^{(2)}(0-N\delta_n)= \quad (29)$$
$$D_0^{(2)}+2D_0^{(3)}\lambda_p+D_0^{(4)}(\lambda_n^2+\lambda_p^2+(N\delta_n)^2+2N\lambda_n\delta_n)$$

Thus the dispersion slope can be tuned by a combination of $\lambda_n$ and $\delta_n$, and is independent of $\lambda_p$. Notably, the dispersion slope varies from channel to channel due to the quadratic terms in Eqs. (20)–(21):

$$s(N\lambda_{ch})=\Delta D^{(2)}/\Delta\lambda=2D_0^{(4)}(\lambda_n+N\delta_n)(\delta_n/\lambda_{ch}) \quad (30)$$

A similar type of behavior can be achieved in the case where the signs of $D^{(4)}$ coefficients of the two gratings are the same, but the signs of $D^{(3)}$ coefficients are opposite. In this arrangement, $D^{(2)}$ may be tuned by $\lambda_n$ and the slope may be tuned by a combination of $\lambda_p$ and $\delta_p$:

$$D^{(2)}(\lambda)=D_0^{(2)}+2D_0^{(3)}\lambda_n+D_0^{(4)}(\lambda^2+\lambda_n^2+\lambda_p^2+2\lambda\lambda_p), \quad (31)$$

$$D^{(2)}(0)=D_0^{(2)}+2D_0^{(3)}\lambda_n+D_0^{(4)}(\lambda_n^2+\lambda_p^2), \quad (32)$$

$$D^{(3)}(\lambda)=2D_0^{(4)}(\lambda+\lambda_p), \quad (33)$$

$$D_1^{(2)}(0+N\delta_p)+D_2^{(2)}(0+N\delta_p)= \quad (34)$$
$$D_0^{(2)}+2D_0^{(3)}\lambda_n+D_0^{(4)}(\lambda_n^2+\lambda_p^2+(N\delta_p)^2+2N\lambda_p\delta_p)$$

$$s(N\lambda_{ch})=\Delta D^{(2)}/\Delta\lambda=2D_0^{(4)}(\lambda_p+N\delta_p)(\delta_p/\lambda_{ch}). \quad (35)$$

Hence, the dispersion slope is independent of $\lambda_n$, but varies with the channel number. For both cases with the same sign $D^{(4)}$, the size of $\delta$ can be reduced or minimized in order to reduce the variation of the slope with channel across the band.

The coefficients $D^{(3)}$ and $D^{(4)}$ may also have arbitrary magnitudes and signs. The tuning behavior of the grating pair is then a superposition of the cases described above.

In addition to the tuning of the dispersion slope described by Eqs. (18), (24), (30), and (35), stretching the sampled gratings has a small effect on the spacing of the channels $\lambda_{ch}$. This effect should be included in determining the appropriate stretch for a desired dispersion slope. For example, if each sampled grating is stretched to produce a fractional change $\Delta\lambda$ in the Bragg wavelength given by $$\gamma=\Delta\lambda/\lambda_0 \quad (36)$$

where $\lambda_0$ is the wavelength of the central channel, the $N^{th}$ channel would then be shifted from $\lambda_0+N\lambda_{ch}$ to $(\lambda_0+N\lambda_{ch})(1+\gamma)=\lambda_0+\Delta\lambda+N(\lambda_{ch}+\gamma\lambda_{ch})$. Therefore, the channel spacing changes incrementally from $\lambda_{ch}$ by $\gamma\lambda_{ch}$. This incremental change in the channel spacing in turn causes an incremental change in the dispersion slope. To quantify this effect, fractional changes in wavelength associated with Eqs. (11) and (12) may be defined as follows, $$\lambda_1=\gamma_1\lambda_0=\lambda_p+\lambda_n=(\gamma_p+\gamma_n)\lambda_0 \quad (37)$$

$$\lambda_2=\gamma_2\lambda_0=\lambda_p-\lambda_n=(\gamma_p-\gamma_n)\lambda_0, \quad (38)$$

where $\lambda_p\equiv\gamma_p\lambda_0$ and $\lambda_n\equiv\gamma_n\lambda_0$ represent fractional changes in the center wavelengths caused by stretches or compressions of the two fiber gratings in the same and opposite directions, respectively.

The dispersion slope of Eq. (18) for the case where $D^{(4)}$ coefficients have opposite signs but $D^{(3)}$ coefficients have same signs in the two gratings are then modified as:

$$s=\Delta D^{(2)}/\Delta\lambda=(2D_0^{(3)}+2D_0^{(4)}(\gamma_n(\lambda_0+N\lambda_{ch})))(\delta_p/\lambda_{ch}+\gamma_p) \quad (39)$$

Similarly, the dispersion slope of Eq. (24) for the case where both $D^{(3)}$ and $D^{(4)}$ coefficients have opposite signs in both gratings becomes:

$$s=\Delta D^{(2)}/\Delta\lambda=(2D_0^{(3)}+2D_0^{(4)}(\gamma_p(\lambda_0+N\lambda_{ch})))(\delta_n/\lambda_{ch}+\gamma_n) \quad (40)$$

The dispersion slope in Eq. (24) for the case where both $D^{(3)}$ and $D^{(4)}$ coefficients have the same signs in both gratings is modified to $$s(N\lambda_{ch})=\Delta D^{(2)}/\Delta\lambda=2D_0^{(4)}(\gamma_n(\lambda_0+2N\lambda_{ch})+N\delta_n)(\delta_n/\lambda_{ch}+\gamma_n). \quad (41)$$

The dispersion slope in Eq. (29) for the case where $D^{(3)}$ coefficients in the two gratings have opposite signs but $D^{(4)}$ coefficients in the two gratings have same signs is modified to $$s(N\lambda_{ch})=\Delta D^{(2)}/\Delta\lambda=2D_0^{(4)}(\gamma_p(\lambda_0+2N\lambda_{ch})+N\delta_p)(\delta_p/\lambda_{ch}+\gamma_p). \quad (42)$$

The above equations suggest two additional effects of the stretch. First, the tuning of the value of the expression in the first set of parentheses in Eqs. (39)–(42) is slightly modified because the effective wavelength shift varies with the channel N. In general, this effect is relatively small in actual implementations and is $\pm N\lambda_{ch}/\lambda_0 \sim \pm 1\%$ for a wavelength range of about $\pm 16$ nm over the C band from 1530 nm to 1565 nm used by many conventional optical telecommunication systems.

Another effect is the additional incremental change in the mismatch between the ITU grid and sampled channel center wavelengths as represented by the last term in Eqs. (39)–(42). For the typical stretching values for these gratings, this effect may produce a 10% variation in the dispersion slope. The grating pair may be used to tune the effective value of the dispersion slope such that when this small effect of the stretch on channel spacing is accounted for, the net effect of the variation of channel spacing plus the tuning of $D^{(3)}$ yields the desired dispersion slope.

As an example of the relative magnitudes of these effects, consider a sampled grating operating over C-band ($\pm 16$ nm) on the ITU 100 Grid ($\pm 20$ channels with $\lambda_{ch}=0.8$ nm) with $D^{(3)}=\pm 2000$ ps/nm$^2$ and a stretching (tuning) range of $\pm 0.2$ nm. Let the dispersion slope of the fiber be 0.0625 ps/nm$^2$/km and the length of fiber be 100 km. When the $D^{(2)}$ at the C-band center is to be compensated for, the residual dispersion at the ends of the band would be $\pm 100\times 0.0625\times 16=\pm 100$ ps/nm. The effective slope quantity in the first set of parentheses in Eqs. (39) and (40) is given by $2D^{(3)}=\pm 4000$ ps/nm$^2$ plus the tuning term proportional to $D^{(4)}$. Assuming the central value of $\pm 4000$ ps/nm$^2$, the ITU mismatch required at the ends of the C-band to compensate for the ±100 ps/nm residual dispersion is given by the fraction ±100/4000=±1/40 of the 0.8 nm channel spacing. Thus, the required effective ITU grid mismatch is ±20 pm at the band ends or ±1.25 pm per channel. If one sets $N\delta=20$ pm in an attempt to obtain exact slope compensation, there would be a residual error, $\gamma\lambda_{ch}$, in the required ITU mismatch from the stretching term in the last in Eqs. (39) and (40). For the ±0.2 nm assumed tuning range, $\gamma=\pm 1.3\times 10^{-4}$ and thus this error effectively is at most 0.10 pm, which is less than 10% of the required mismatch. To correct for this term one could either tune the 4000 ps/nm² slope quantity with the appropriate stretch, or eliminate the stretch that leads to the error. For the case of Eq. (40), this error may be eliminated by setting $\lambda_n$ and $\gamma_n=0$. This setting, however, also eliminates the possibility of tuning $D^{(2)}$ so that the grating pair provides tunable dispersion slope without a net $D^{(3)}$. Alternately, in either Eq. (39) or (40), one could simultaneously adjust both the same- and opposite-sense stretches in the two gratings to achieve the desired tunable slope and dispersion compensation. This adjustment would likely produce nonzero $D^{(3)}$.

In another example, consider the cases with $D^{(4)}$ of the same sign in the FBGs. In some applications, it may be desirable to keep the variation of slope with channel number owing to the quadratic tuning terms at a minimum. Assume this effect is desired to be less than 10% of the slope over the C-band. This can be achieved based on Eq. (42) when $N\delta_p<0.1\lambda_p$ for N<20. To achieve the same slope compensation with the parameters discussed above, this requires a value of $D^{(4)}=10000$ ps/nm³, $\delta_p=1.25$ pm and $\lambda_p=0.2$ nm. According to Eq. (33), the net value of $D(^3)$ is tuned to a value of 4000 ps/nm². However, an appropriate choice of $D_0^{(3)}$ can be designed to fully or partially cancel out this value of $D^{(3)}$. In addition, the nonlinear overshoot of the slope at the end of the band may be further reduced by reducing the designed slope value (e.g. by reducing $\delta_p$) so that the net overshoot at the band end is also reduced. This can also have the effect of under compensating the slope near the band center, where slope compensation is less important, but would increase the overall accuracy of slope compensation over the entire band.

TABLE 1 summarizes the tuning operations of the grating pair with two nonlinearly-chirped fiber Bragg gratings in four different configurations. The stretches of the two gratings are given in components of equal $(\lambda_p)$ and opposite stretches $(\lambda_n)$ [see Eqs. (11) and (12)]. The parameter $\gamma_{n,p}=\lambda_{n,p}/\lambda_0$, $\lambda_0$ is the central channel wavelength, $\lambda_N=\lambda_0+N\lambda_{ch}$ is the center wavelength of the Nth channel from band center, $\lambda_{ch}$ is the channel separation, and $\delta$ is the incremental difference between the ITU grid channel spacing and the channel separation in the sampled FBG. Parameters $\delta_p$ and $\delta_n$ represent incremental channel spacings, which are of the same and opposite sign in the two gratings, respectively. The formulae for $D^{(2)}$ and $D^{(3)}$ can be extended to the Nth channel from band center by replacing $\lambda_{n,p}$ by $\gamma_{n,p}\lambda_N$.

In addition, the magnitudes of $D^{(3)}$ or $D^{(4)}$ coefficients in the two gratings may be different in the four different configurations listed in TABLE 1. Accordingly, the amounts of tuning in $\lambda_1$ and $\lambda_2$ in the two gratings are not symmetric in that the anti-symmetric stretches $\lambda_n$ and the symmetric stretches $\lambda_p$ are different in magnitude in the two gratings.

TABLE 1

TUNING OF GRATING PAIR

| | Same $D^{(3)}$ and opposite $D^{(4)}$ in both gratings | Opposite $D^{(3)}$ and $D^{(4)}$ in both gratings |
|---|---|---|
| Primary Tuning Mechanism for $D^{(2)}$ | $\lambda_p$ | $\lambda_n$ |
| Primary Tuning Mechanism for $D^{(3)}$ | $\lambda_n$ | $\lambda_n$ |
| Primary Tuning Mechanisms for slope s | $\lambda_n, \delta_p$ | $\lambda_p, \delta_n$ |
| Formula for $D^{(2)}$ at the center of the center channel | $D_0^{(2)} + (2D_0^{(3)} + 2D_0^{(4)}\lambda_n)\lambda_p$ | $D_0^{(2)} + (2D_0^{(3)} + 2D_0^{(4)}\lambda_p)\lambda_n$ |
| Formula for $D^{(3)}$ at the center of the center channel | $2D_0^{(3)} + 2D_0^{(4)}\lambda_n$ | $2D_0^{(4)}\lambda_n$ |
| Formula for slope s at Nth channel from band center | $(2D_0^{(3)} + 2D_0^{(4)}\gamma_n\lambda_N)(\delta_p/\lambda_{ch} + \gamma_p)$ | $(2D_0^{(3)} + 2D_0^{(4)}\gamma_p\lambda_N)(\delta_n/\lambda_{ch} + \gamma_n)$ |

| | Same $D^{(3)}$ and $D^{(4)}$ in both gratings | Opposite $D^{(3)}$ and same $D^{(4)}$ in both gratings |
|---|---|---|
| Primary Tuning Mechanism for $D^{(2)}$ | $\lambda_p$ | $\lambda_n$ |
| Primary Tuning Mechanism for $D^{(3)}$ | $\lambda_p$ | $\lambda_p$ |
| Primary Tuning Mechanisms for slope s | $\lambda_n, \delta_n$ | $\lambda_p, \delta_p$ |
| Formula for $D^{(2)}$ at the center of the center channel | $D_0^{(2)} + 2D_0^{(3)}\lambda_p + D_0^{(4)}(\lambda_n^2 + \lambda_p^2)$ | $D_0^{(2)} + 2D_0^{(3)}\lambda_n + D_0^{(4)}(\lambda_n^2 + \lambda_p^2)$ |
| Formula for $D^{(3)}$ at the center of the center channel | $2D_0^{(3)} + 2D_0^{(4)}\lambda_p$ | $2D_0^{(4)}\lambda_p$ |
| Formula for slope s at Nth channel from band center | $2D_0^{(4)}(\gamma_n(\lambda_0 + 2N\lambda_{ch}) + N\delta_n) \times (\delta_n/\lambda_{ch} + \gamma_n)$ | $2D_0^{(4)}(\gamma_p(\lambda_0 + 2N\lambda_{ch}) + N\delta_p) \times (\delta_p/\lambda_{ch} + \gamma_p)$ |

The above description uses nonlinearly-chirped fiber Bragg gratings as examples for implementing tunable fiber Bragg gratings capable of producing tunable nonlinear group delays. Other types of fiber Bragg gratings may also be used to form a desired grating pair. For example, a non-chirped fiber grating with a grating parameter $n_{eff}(z)\Lambda(z)$ that is independent of position z may be designed to have a spatial-varying grating strength or phase shift to produce a nonlinear group delay such as the examples summarized in TABLE I. Feced et al. disclose such a dispersion-compensating fiber Bragg grating without chirping in which $D_0^{(3)}\neq 0$ and $D_0^{(2)}=0$ in "An Efficient Inverse Scattering Algorithm for the Design of Nonuniform Fiber Bragg Gratings," IEEE Journal of Quantum Electronics, Vol. 35, No. 8, pp. 1105–1115 (August 1999). Feced et al show in FIG. 12 an example of the amplitude of the spatially-varying grating strength in a grating which produces nonlinear group delay. At locations where the amplitude function passes through zero, the phase of the grating index modulation experiences a phase shift of 180 degrees. That is, the periodicity of the grating is interrupted by a half-period shift at each zero location. Similarly to a nonlinearly-chirped fiber Bragg grating, a grating sampling pattern may be fabricated in the fiber grating to overlap the underlying grating so that multiple Bragg reflection bands can be produced. Such a fiber Bragg grating with a constant grating period may be engaged to a fiber control unit to form a tunable dispersion element with or without other gratings. One or more aspects of the dispersion produced by this grating, such as the dispersion, the rate of change in the dispersion with respect to wavelength, or the change of the dispersion from one WDM channel to an adjacent WDM channel can be tuned by, e.g., mechanically stretching or compressing the fiber grating, or controlling the temperature of the fiber grating.

In the various grating pairs discussed in this application, the two gratings capable of producing nonlinear group delays may be of the same type, e.g., both are nonlinearly-chirped gratings or non-chirped gratings. In addition, the two gratings may be different types in that one grating may be a nonlinearly-chirped fiber Bragg grating while the other may be a non-chirped fiber Bragg grating. For example, when two different types of gratings are combined in a pair to produce a tunable total induced dispersion independent of wavelength as shown in FIGS. 2A–2D by tuning only one fiber grating, the tunable grating may be the non-chirped grating and the nonlinearly-chirped grating may have a fixed overall length to produce a fixed nonlinear group delay.

As described above, a fiber Bragg grating operable to produce a nonlinear group delay, either chirped or not, may be configured as a tunable grating by uniformly changing the length of the underlying fiber. This uniform change in the fiber length causes a shift in the center wavelength of each Bragg reflection band and hence the frequency detuning of an input optical signal relative to the center wavelength. Hence, the group delay can be tuned. A grating control device may be engaged to the fiber grating to change the fiber length for this tuning operation. A mechanical fiber stretcher, for example, may be used to apply a uniform stretch or compression to tune the nonlinear group delay. In addition, a thermal device may be used to uniformly control the temperature of the fiber grating to effectuate the tuning operation by changing both the length and the refractive index of the fiber grating.

Although the present disclosure only includes a few embodiments, various modifications and enhancements may be made without departing from the following claims.

What is claimed is:

1. A device, comprising:
    a first fiber Bragg grating operable to receive an input optical signal to produce a first output optical signal by reflection within a first Bragg reflection band and configured to have a first grating pattern which produces a group delay in said first output optical signal as a nonlinear function of a frequency detuning of a wavelength of said input optical signal from a center wavelength of said first Bragg reflection band;
    a second fiber Bragg grating coupled to receive said first output optical signal to produce a second output optical signal by reflection within a second Bragg reflection band and configured to have a second grating pattern which produces a group delay in said second output optical signal as a nonlinear function of a frequency detuning of a wavelength of said first output optical signal from a center wavelength of said second Bragg reflection band,
    wherein said first and said second grating patterns are designed to produce a net grating dispersion in said second output signal that is independent of a wavelength of reflected light; and
    a fiber control unit coupled to at least one of said first and said second fiber Bragg gratings and operable to control said one fiber Bragg grating to tune said net grating dispersion in said second output signal.

2. The device as in claim 1, wherein each of said first and said second fiber Bragg gratings is birefringent to have orthogonal fast and slow principal axes of polarization.

3. The device as in claim 2, further comprising a polarization rotator disposed in an optical path between said first and said second fiber Bragg gratings and operable to rotate polarization of said first output signal.

4. The device as in claim 3, wherein said polarization rotator is operable in a way that a polarization parallel at said first fiber Bragg grating to said fast principal axis becomes parallel to said slow principal axis at said second fiber Bragg grating and a polarization parallel at said first fiber Bragg grating to said slow principal axis becomes parallel to said fast principal axis at said second fiber Bragg grating.

5. The device as in claim 1, wherein at least one of said first and said second fiber Bragg gratings is configured to have a grating pattern spatially chirped as a nonlinear function of a position along said fiber Bragg grating.

6. The device as in claim 5, wherein said at least one fiber Bragg grating has a grating period that changes nonlinearly with position along said fiber Bragg grating.

7. The device as in claim 1, wherein at least one of said first and said second fiber Bragg gratings has a grating pattern spatially chirped as a nonlinear function of a position along said fiber Bragg grating.

8. The device as in claim 1, wherein said first fiber Bragg grating is engaged to said grating control unit and is tunable, said second fiber Bragg grating is not tunable but is pre-stretched by a fixed amount so that said first fiber Bragg grating is stretched to increase said net grating dispersion and is compressed to decrease said net grating dispersion.

9. The device as in claim 1, wherein said first fiber Bragg grating is engaged to said grating control unit and is tunable, and further comprising a second grating control unit engaged to control said second fiber Bragg grating, wherein said grating control units are operable to respectively change said length of said first fiber Bragg grating opposite to a change in said length of said second fiber Brag grating.

10. The device as in claim 1, further comprising a dispersive fiber link connected between said first and said second fiber Bragg gratings to transmit said first output signal from said first fiber Bragg grating to said second fiber Bragg grating.

11. The device as in claim 1, further comprising an optical circulator coupled to said first and said second fiber Bragg gratings and operable to direct said first output signal from said first fiber Bragg grating to said second fiber Bragg grating without going through a dispersive fiber link.

12. The device as in claim 1, wherein at least one of said first and said second fiber Bragg gratings is configured to have a grating pattern which has a constant grating period and a spatially-changing grating strength along said fiber Bragg grating.

13. The device as in claim 1, wherein at least one of said first and said second fiber Bragg gratings is configured to have a grating pattern which has a constant grating period and a spatially-changing shift of a phase of a grating pattern along said fiber Bragg grating.

14. The device as in claim 1, wherein said first fiber Bragg grating has a nonlinearly-chirped grating period and is fixed to produce a constant nonlinear group delay and said second fiber Bragg grating has a constant grating period and is tunable to produce a tunable nonlinear group delay, and wherein tuning of said second fiber Bragg grating tunes said net grating dispersion.

15. The device as in claim 1, wherein each fiber Bragg grating is configured to produce a constant dispersion independent of a wavelength of reflected light and a linear dispersion as a linear function of a wavelength of reflected light, wherein said linear dispersion of said first fiber Bragg grating has a sign opposite to a sign of said linear dispersion of said second fiber Bragg grating.

16. A device, comprising:
a first fiber Bragg grating operable to receive an input optical signal to produce a first output optical signal by reflection within a first Bragg reflection band and configured to have a first grating pattern which produces a group delay in said first output optical signal as a nonlinear function of a frequency detuning of a wavelength of said input optical signal from a center wavelength of said first Bragg reflection band;
a second fiber Bragg grating coupled to receive said first output optical signal to produce a second output optical signal by reflection within a second Bragg reflection band and configured to have a second grating pattern which produces a group delay in said second output optical signal as a nonlinear function of a frequency detuning of a wavelength of said first output optical signal from a center wavelength of said second Bragg reflection band,
wherein each fiber Bragg grating is configured to produce a grating dispersion having a constant dispersion independent of a wavelength of reflected light, a linear dispersion as a linear function of a wavelength of reflected light, and a quadratic dispersion as a quadratic function of a wavelength of reflected light;
a first fiber control unit coupled to said first fiber Bragg grating and operable to control said first fiber Bragg grating to tune a first grating dispersion in said first output signal; and
a second fiber control unit coupled to said second fiber Bragg grating and operable to control said second fiber Bragg grating to tune a second grating dispersion in said second output signal,
wherein said first and said second grating patterns are configured so that said first and said second fiber control units are operable to tune a total induced dispersion at an operating wavelength in said second output signal by changing lengths of said first and said second fiber Bragg gratings in a first manner, and to tune a rate of change in said total induced dispersion with respect to wavelength by changing lengths of said first and said second fiber Bragg gratings in a second, different manner.

17. The device as in claim 16, wherein said linear dispersion of said first fiber Bragg grating has the same sign as said linear dispersion of said second fiber Bragg grating, and said quadratic dispersion of said first fiber Bragg grating has a sign opposite to a sign of said quadratic dispersion of said second fiber Bragg grating.

18. The device as in claim 17, wherein each fiber Bragg grating is further configured to have a spatial periodic sampling pattern with a sampling period greater than a grating period of each grating so that each grating produces a plurality of reflection bands spaced by a band spacing in frequency which is different from a channel spacing in frequency for a plurality of WDM channels in said input optical signal.

19. The device as in claim 18, wherein a frequency difference between said band spacing and said channel spacing in said first fiber Bragg grating has the same sign as a frequency difference between said band spacing and said channel spacing in said second fiber Bragg grating, and wherein said first and said second fiber control units operate to increase a length of one fiber Bragg grating while decreasing a length of the other fiber Bragg grating to tune a change in said total induced dispersion in said second output signal from one channel to an adjacent channel.

20. The device as in claim 17, wherein tuning in said first manner is to increase or decrease lengths of both said first and said second fiber Bragg gratings together, and tuning in said second, different manner is to increase a length of one fiber Bragg grating while decreasing a length of the other fiber Bragg grating.

21. The device as in claim 16, wherein said linear dispersion of said first fiber Bragg grating has a sign opposite to a sign of said linear dispersion of said second fiber Bragg grating, and said quadratic dispersion of said first fiber Bragg grating has the same sign as said quadratic dispersion of said second fiber Bragg grating.

22. The device as in claim 21, wherein each fiber Bragg grating is further configured to have a spatial periodic sampling pattern with a sampling period greater than a grating period of each grating so that each grating produces a plurality of reflection bands spaced by a band spacing in frequency different from a channel spacing in frequency for a plurality of WDM channels in said input optical signal.

23. The device as in claim 22, wherein a frequency difference between said band spacing and said channel spacing in said first fiber Bragg grating has the same sign as a frequency difference between said band spacing and said channel spacing in said second fiber Bragg grating, and wherein said first and said second fiber control units operate to increase or decrease lengths of both said first and said second fiber Bragg gratings together to tune a change in said total induced dispersion in said second output signal from one channel to an adjacent channel.

24. The device as in claim 21, wherein tuning in said first manner is to increase a length of one fiber Bragg grating while decreasing a length of the other fiber Bragg grating, and tuning in said second, different manner is to increase or decrease lengths of both said first and said second fiber Bragg gratings together.

25. The device as in claim 16, wherein each of said first and said second fiber Bragg gratings is birefringent to have orthogonal fast and slow principal axes of polarization.

26. The device as in claim 25, further comprising a polarization rotator disposed in an optical path between said first and said second fiber Bragg gratings and operable to rotate polarization of said first output signal.

27. The device as in claim 25, wherein said polarization rotator is operable in a way that a polarization parallel at said first fiber Bragg grating to said fast principal axis becomes parallel to said slow principal axis at said second fiber Bragg grating and a polarization parallel at said first fiber Bragg grating to said slow principal axis becomes parallel to said fast principal axis at said second fiber Bragg grating.

28. The device as in claim 16, further comprising a dispersive fiber link connected between said first and said second fiber Bragg gratings to transmit said first output signal from said first fiber Bragg grating to said second fiber Bragg grating.

29. The device as in claim 16, further comprising an optical circulator coupled to said first and said second fiber Bragg gratings and operable to direct said first output signal from said first fiber Bragg grating to said second fiber Bragg grating without going through a dispersive fiber link.

30. The device as in claim 16, wherein at least one of said first and said second fiber Bragg gratings is configured to have a grating pattern spatially chirped as a nonlinear function of a position along said fiber Bragg grating.

31. The device as in claim 16, wherein at least one of said first and said second fiber Bragg gratings is configured to have a grating pattern which has a constant grating period and a spatially-changing grating strength along said fiber Bragg grating.

32. The device as in claim 16, wherein at least one of said first and said second fiber Bragg gratings is configured to have a grating pattern which has a constant grating period and a spatially-changing shift of a phase of a grating pattern along said fiber Bragg grating.

33. The device as in claim 16, wherein at least one grating control unit includes a mechanical fiber stretcher.

34. The device as in claim 16, wherein at least one grating control unit includes a thermal device that changes a temperature of a respective fiber Bragg grating so as to tune a nonlinear group delay produced thereby.

35. A device, comprising:
a first fiber Bragg grating operable to receive an input optical signal and to produce a first output optical signal by reflection; and
a second fiber Bragg grating coupled to receive said first output optical signal and to produce a second output optical signal by reflection,
wherein each of said first and said second fiber Bragg gratings has a spatial grating pattern to produce a grating dispersion having a constant dispersion that is independent of a wavelength of reflected light, a linear dispersion that is a linear function of a wavelength of reflected light, and a quadratic dispersion that is a quadratic function of a wavelength of reflected light;
a first fiber control unit coupled to said first fiber Bragg grating and operable to control said first fiber Bragg grating to tune a first grating dispersion in said first output signal; and
a second fiber control unit coupled to said second fiber Bragg grating and operable to control said second fiber Bragg grating to tune a second grating dispersion in said second output signal,
wherein said first and said second grating patterns are configured so that both a total induced dispersion in said second output signal and a rate of change in said total induced dispersion with respect to wavelength are tunable by changing lengths of said first and said second fiber Bragg gratings in a first manner while said rate of change in said total induced dispersion with respect to wavelength is not tunable by changing lengths of said first and said second fiber Bragg gratings in a second, different manner which tunes said total induced dispersion.

36. The device as in claim 35, wherein said linear dispersion of said first fiber Bragg grating has a sign opposite to a sign of said linear dispersion of said second fiber Bragg grating, and said quadratic dispersion of said first fiber Bragg grating has a sign opposite to a sign of said quadratic dispersion of said second fiber Bragg grating.

37. The device as in claim 36, wherein each of said first and said second fiber Bragg gratings is further configured to have a spatial periodic sampling pattern with a sampling period greater than a grating period of each grating so that each grating produces a plurality of reflection bands spaced by a band spacing in frequency, and wherein said input optical signal includes a plurality of WDM channels with a channel spacing in frequency different from said band spacing.

38. The device as in claim 37, wherein a frequency difference between said band spacing and said channel spacing in said first fiber Bragg grating has a sign opposite to a sign of a frequency difference between said band spacing and said channel spacing in said second fiber Bragg grating, and wherein said first and said second fiber control units operate to increase or decrease lengths of both said first and said second fiber Bragg gratings together to tune a change in said total induced dispersion in said second output signal from one channel to an adjacent channel.

39. The device as in claim 36, wherein tuning in said first manner is to increase a length of one fiber Bragg grating while decreasing a length of the other fiber Bragg grating, and wherein tuning in said second, different manner is to increase or decrease lengths of both said first and said second fiber Bragg gratings together.

40. The device as in claim 35, wherein said linear dispersion of said first fiber Bragg grating has the same sign as said linear dispersion of said second fiber Bragg grating, and said quadratic dispersion of said first fiber Bragg grating has the same as said quadratic dispersion of said second fiber Bragg grating.

41. The device as in claim 40, wherein each of said first and said second fiber Bragg gratings is further configured to have a spatial periodic sampling pattern with a sampling period greater than a grating period of each grating so that each grating produces a plurality of reflection bands spaced by a band spacing in frequency, and wherein said input optical signal includes a plurality of WDM channels with a channel spacing in frequency different from said band spacing.

42. The device as in claim 41, wherein a frequency difference between said band spacing and said channel spacing in said first fiber Bragg grating has a sign opposite to a sign of a frequency difference between said band spacing and said channel spacing in said second fiber Bragg grating, and wherein a change in said total induced dispersion in said second output signal from one channel to an adjacent channel is tunable by increasing a length of one fiber Bragg grating while decreasing a length of the other fiber Bragg grating.

43. The device as in claim 40, wherein tuning in said first manner is to increase or decrease lengths of both said first and said second fiber Bragg gratings together, and wherein tuning in said second, different manner is to increase a length of one fiber Bragg grating while decreasing a length of the other fiber Bragg grating.

44. The device as in claim 35, wherein each of said first and said second fiber Bragg gratings is birefringent to have orthogonal fast and slow principal axes of polarization.

45. The device as in claim 44, further comprising a polarization rotator disposed in an optical path between said first and said second fiber Bragg gratings and operable to rotate polarization of said first output signal.

46. The device as in claim 45, wherein said polarization rotator is operable in a way that a polarization parallel at said first fiber Bragg grating to said fast principal axis becomes parallel to said slow principal axis at said second fiber Bragg grating and a polarization parallel at said first fiber Bragg grating to said slow principal axis becomes parallel to said fast principal axis at said second fiber Bragg grating.

47. The device as in claim 35, further comprising a dispersive fiber link connected between said first and said second fiber Bragg gratings to transmit said first output signal from said first fiber Bragg grating to said second fiber Bragg grating.

48. The device as in claim 35, further comprising an optical circulator coupled to said first and said second fiber Bragg gratings and operable to direct said first output signal from said first fiber Bragg grating to said second fiber Bragg grating without going through a dispersive fiber link.

49. The device as in claim 35, wherein at least one of said first and said second fiber Bragg gratings is configured to have a grating pattern spatially chirped as a nonlinear function of a position along said fiber Bragg grating.

50. The device as in claim 35, wherein at least one of said first and said second fiber Bragg gratings is configured to have a grating pattern which has a constant grating parameter and a spatially-changing grating strength along said fiber Bragg grating.

51. The device as in claim 35, wherein at least one grating control unit includes a mechanical fiber stretcher.

52. The device as in claim 35, wherein at least one grating control unit includes a thermal device that changes a temperature of a respective fiber Bragg grating so as to tune a nonlinear group delay produced thereby.

53. A method, comprising:
providing first and second fiber Bragg gratings, each grating having a grating pattern which produces a group delay in reflecting an optical signal as a nonlinear function of a frequency detuning of a wavelength of said optical signal from a center wavelength of a Bragg reflection band of said grating, wherein said group delay corresponds to a grating dispersion having a constant dispersion independent of a wavelength of reflected light, a linear dispersion as a linear function of a wavelength of reflected light, and a quadratic dispersion as a quadratic function of a wavelength of reflected light;
directing an input optical signal into said first fiber Bragg grating to produce a first output signal by reflection;
directing said first output signal into said second fiber Bragg grating to produce a second output signal by reflection;
controlling lengths of said first and said second fiber Bragg gratings in a first way to tune a total induced dispersion in said second output signal; and
controlling lengths of said first and said second fiber Bragg gratings in a second, different way to tune a rate of change in said total induced dispersion with respect to wavelength.

54. The method as in claim 53, wherein said first nonlinear dispersion of said first fiber Bragg grating has the same sign as said first nonlinear dispersion of said second fiber Bragg grating, and said second nonlinear dispersion of said first fiber Bragg grating has a sign opposite to a sign of said second nonlinear dispersion of said second fiber Bragg grating.

55. The method as in claim 54, further comprising:
tuning said total induced dispersion in said second output signal by increasing or decreasing lengths of both said first and said second fiber Bragg gratings together; and
tuning said rate of change in said total induced dispersion by increasing a length of one fiber Bragg grating while decreasing a length of the other fiber Bragg grating.

56. The method as in claim 55, wherein each of said first and said second fiber Bragg gratings is further configured to have a spatial periodic sampling pattern with a sampling period greater than a grating period of each grating so that each grating produces a plurality of reflection bands spaced by a band spacing in frequency which is different from a channel spacing in frequency for a plurality of WDM channels in said input optical signal, and wherein a frequency difference between said band spacing and said channel spacing in said first fiber Bragg grating has the same sign as a frequency difference between said band spacing and said channel spacing in said second fiber Bragg grating.

57. The method as in claim 56, further comprising tuning a change in said total induced dispersion in said second output signal from one channel to an adjacent channel by increasing a length of one fiber Bragg grating while decreasing a length of the other fiber Bragg grating.

58. The method as in claim 53, wherein said linear dispersion of said first fiber Bragg grating has a sign opposite to a sign of said linear dispersion of said second fiber Bragg grating, and said quadratic dispersion of said first fiber Bragg grating has the same sign as said quadratic dispersion of said second fiber Bragg grating.

59. The method as in claim 58, wherein each fiber Bragg grating is further configured to have a spatial periodic sampling pattern with a sampling period greater than a grating period of each grating so that each grating produces a plurality of reflection bands spaced by a band spacing in frequency different from a channel spacing in frequency for a plurality of WDM channels in said input optical signal, and wherein a frequency difference between said band spacing and said channel spacing in said first fiber Bragg grating has the same sign as a frequency difference between said band spacing and said channel spacing in said second fiber Bragg grating.

60. The method as in claim 59, further comprising increasing or decreasing lengths of both said first and said second fiber Bragg gratings together to tune a change in said total induced dispersion in said second output signal from one channel to an adjacent channel.

61. The method as in claim 58, further comprising:
tuning said total induced dispersion in said second output signal by increasing a length of one fiber Bragg grating while decreasing a length of the other fiber Bragg grating; and
tuning said rate of change in said total induced dispersion by increasing or decreasing lengths of both said first and said second fiber Bragg gratings together.

62. The method as in claim 53, wherein each of said first and said second fiber Bragg gratings is formed in a birefringent fiber so as to control polarization-mode dispersion in said second output signal.

63. The method as in claim 62, further comprising controlling polarization of said first output signal upon entry of said second fiber Bragg grating to control said polarization-mode dispersion in said second output signal.

64. The method as in claim 53, wherein one of said first and said second ways includes increasing a length of one fiber Bragg grating while decreasing a length of the other fiber Bragg grating, and the other of said first and said second ways includes increasing or decreasing lengths of both said first and said second fiber Bragg gratings together.

65. The device as in claim 53, wherein at least one of said first and said second fiber Bragg gratings is configured to have a grating pattern which has a constant grating period and a spatially-changing shift of a phase of a grating pattern along said fiber Bragg grating.

66. The method as in claim 53, further comprising connecting said first and said second fiber Bragg gratings at two different locations in a dispersive fiber so that said first output signal transmits through a portion of the dispersive fiber before entry of said second fiber Bragg grating.

67. The method as in claim 53, further comprising connecting said first and said second fiber Bragg gratings at the same location in a dispersive fiber so that said first output signal is directly coupled into said second fiber Bragg grating.

68. The method as in claim 53, wherein at least one of said first and said second fiber Bragg gratings is configured to have a grating pattern spatially chirped as a nonlinear function of a position along said fiber Bragg grating.

69. The method as in claim 53, wherein at least one of said first and said second fiber Bragg gratings is configured to have a grating pattern which has a constant grating period and a spatially-changing grating strength along said fiber Bragg grating.

70. The method as in claim 53, wherein one of said first and said second fiber Bragg gratings is controlled to tune a group delay in its output while the other fiber Bragg grating is not tuned and is fixed to produce a constant nonlinear group delay.

71. A method, comprising:
providing first and second fiber Bragg gratings, each grating having a grating pattern which produces a group delay in reflecting an optical signal as a nonlinear function of a frequency detuning of a wavelength of said optical signal from a center wavelength of a Bragg reflection band of said grating, wherein said group delay corresponds to a grating dispersion having a constant dispersion independent of a wavelength of reflected light, a linear dispersion as a linear function of a wavelength of reflected light which has opposite signs in said first and said second gratings, and a quadratic dispersion as a quadratic function of a wavelength of reflected light which has opposite signs in said first and said second gratings;
directing an input optical signal into said first fiber Bragg grating to produce a first output signal by reflection;
directing said first output signal into said second fiber Bragg grating to produce a second output signal by reflection; and
changing a length of at least one of said first and said second fiber Bragg gratings to tune a property of a total induced dispersion in said second output signal.

72. The method as in claim 71, wherein each fiber Bragg grating is further configured to have a spatial periodic sampling pattern with a sampling period greater than a grating period of each grating so that each grating produces a plurality of reflection bands spaced by a band spacing in frequency different from a channel spacing in frequency for a plurality of WDM channels in said input optical signal, and wherein a frequency difference between said band spacing and said channel spacing in said first fiber Bragg grating has a sign opposite to a sign of a frequency difference between said band spacing and said channel spacing in said second fiber Bragg grating.

73. The method as in claim 72, wherein said changing a length of at least one of said first and said second fiber Bragg gratings includes increasing or decreasing lengths of both said first and said second fiber Bragg gratings together to tune a change in said total induced dispersion in said second output signal from one channel to an adjacent channel.

74. The method as in claim 73, wherein said changing a length of at least one of said first and said second fiber Bragg gratings further includes increasing a length of one fiber Bragg grating while decreasing a length of the other fiber Bragg grating to tune a total induced dispersion in said second output signal and a rate of change in said total induced dispersion with respect to wavelength.

75. The method as in claim 72, wherein said changing a length of at least one of said first and said second fiber Bragg gratings includes only increasing or decreasing lengths of both said first and said second fiber Bragg gratings together, without increasing a length of one fiber Bragg grating while decreasing a length of the other fiber Bragg grating, to tune a change in said total induced dispersion in said second output signal from one channel to an adjacent channel without changing a total induced dispersion in said second output signal and a rate of change in said total induced dispersion with respect to wavelength.

76. The method as in claim 71, wherein each of said first and said second fiber Bragg gratings is formed in a birefringent fiber so as to control polarization-mode dispersion in said second output signal.

77. The method as in claim 76, further comprising controlling polarization of said first output signal upon entry of said second fiber Bragg grating to control said polarization-mode dispersion in said second output signal.

78. The device as in claim 71, wherein at least one of said first and said second fiber Bragg gratings is configured to have a grating pattern which has a constant grating period and a spatially-changing shift of a phase of a grating pattern along said fiber Bragg grating.

79. The method as in claim 71, further comprising connecting said first and said second fiber Bragg gratings at two different locations in a dispersive fiber so that said first output signal transmits through a portion of the dispersive fiber before entry of said second fiber Bragg grating.

80. The method as in claim 71, further comprising connecting said first and said second fiber Bragg gratings at the same location in a dispersive fiber so that said first output signal is directly coupled into said second fiber Bragg grating.

81. The method as in claim 71, wherein said changing a length of at least one of said first and said second fiber Bragg gratings includes increasing a length of one fiber Bragg grating while decreasing a length of the other fiber Bragg grating to tune a total induced dispersion in said second output signal and a rate of change in said total induced dispersion with respect to wavelength.

82. The method as in claim 71, wherein at least one of said first and said second fiber Bragg gratings is configured to have a grating pattern which has a constant grating period and a spatially-changing grating strength along said fiber Bragg grating.

83. The method as in claim 71, wherein one of said first and said second fiber Bragg gratings is controlled to tune a group delay in its output while the other fiber Bragg grating is not tuned and is fixed to produce a constant nonlinear group delay.

84. A method, comprising:
providing first and second fiber Bragg gratings, each grating having a grating pattern which produces a group delay in reflecting an optical signal as a nonlinear function of a frequency detuning of a wavelength of said optical signal from a center wavelength of a Bragg reflection band of said grating, wherein said group delay corresponds to a grating dispersion having a constant dispersion independent of a wavelength of reflected light, a linear dispersion as a linear function of a wavelength of reflected light which has the same sign in both said first and said second gratings together, and a quadratic dispersion as a quadratic function of a wavelength of reflected light which has the same sign in both said first and said second gratings together;
directing an input optical signal into said first fiber Bragg grating to produce a first output signal by reflection;
directing said first output signal into said second fiber Bragg grating to produce a second output signal by reflection; and
changing a length of at least one of said first and said second fiber Bragg gratings to tune a property of a total induced dispersion in said second output signal.

85. The method as in claim 84, wherein each fiber Bragg grating is further configured to have a spatial periodic sampling pattern with a sampling period greater than a grating period of each grating so that each grating produces a plurality of reflection bands spaced by a band spacing in frequency different from a channel spacing in frequency for a plurality of WDM channels in said input optical signal, and wherein a frequency difference between said band spacing and said channel spacing in said first fiber Bragg grating has a sign opposite to a sign of a frequency difference between said band spacing and said channel spacing in said second fiber Bragg grating.

86. The method as in claim 85, wherein said changing a length of at least one of said first and said second fiber Bragg gratings includes increasing a length of one fiber Bragg grating while decreasing a length of the other fiber Bragg grating to tune a change in said total induced dispersion in said second output signal from one channel to an adjacent channel.

87. The method as in claim 86, wherein said changing a length of at least one of said first and said second fiber Bragg gratings further includes increasing or decreasing lengths of both said first and said second fiber Bragg gratings together to tune a total induced dispersion in said second output signal and a rate of change in said total induced dispersion with respect to wavelength.

88. The method 84, wherein said changing a length of at least one of said first and said second fiber Bragg gratings includes increasing or decreasing lengths of both said first and said second fiber Bragg gratings together to tune a total induced dispersion in said second output signal and a rate of change in said total induced dispersion with respect to wavelength.

89. The method as in claim 88, wherein said changing a length of at least one of said first and said second fiber Bragg gratings includes only increasing a length of one fiber Bragg grating while decreasing a length of the other fiber Bragg grating, without increasing or decreasing lengths of both said first and said second fiber Bragg gratings together, to tune a change in said total induced dispersion in said second output signal from one channel to an adjacent channel without changing a rate of change in said total induced dispersion with respect to wavelength.

90. The method as in claim 84, wherein each of said first and said second fiber Bragg gratings is formed in a birefringent fiber so as to control polarization-mode dispersion in said second output signal.

91. The method as in claim 90, further comprising controlling polarization of said first output signal upon entry of said second fiber Bragg grating to control said polarization-mode dispersion in said second output signal.

92. The method as in claim 84, further comprising connecting said first and said second fiber Bragg gratings at two different locations in a dispersive fiber so that said first output signal transmits through a portion of the dispersive fiber before entry of said second fiber Bragg grating.

93. The method as in claim 84, further comprising connecting said first and said second fiber Bragg gratings at the same location in a dispersive fiber so that said first output signal is directly coupled into said second fiber Bragg grating.

94. The method as in claim 84, wherein at least one of said first and said second fiber Bragg gratings is configured to have a grating pattern which has a constant grating period and a spatially-changing grating strength along said fiber Bragg grating.

95. The device as in claim 84, wherein at least one of said first and said second fiber Bragg gratings is configured to have a grating pattern which has a constant grating period and a spatially-changing shift of a phase of a grating pattern along said fiber Bragg grating.

96. The method as in claim 84, wherein one of said first and said second fiber Bragg gratings is controlled to tune a group delay in its output while the other fiber Bragg grating is not tuned and is fixed to produce a constant nonlinear group delay.

97. A method, comprising:
directing an input optical signal into a first fiber Bragg grating to produce a first output optical signal by reflection, said first fiber Bragg grating having a first grating pattern which produces a group delay in said first output optical signal as a nonlinear function of a wavelength of reflected light;
directing said first output optical signal into a second fiber Bragg grating to produce a second output optical signal by reflection, said second fiber Bragg grating having a second grating pattern which produces a group delay in said second output optical signal as a nonlinear function of a wavelength of reflected light, wherein said first and said second grating patterns are designed to produce a net dispersion in said second output signal that is independent of a wavelength of reflected light; and
controlling a length of at least one of said first and said second fiber Bragg gratings to tune said net grating dispersion in said second output signal.

98. The method as in claim 97, wherein each of said first and said second fiber Bragg gratings is birefringent to have orthogonal fast and slow principal axes of polarization.

99. The method as in claim 98, further comprising rotating polarization of said first output signal prior to entering said second fiber Bragg grating.

100. The method as in claim 99, wherein a polarization parallel at said first fiber Bragg grating to said fast principal axis becomes parallel to said slow principal axis at said second fiber Bragg grating and a polarization parallel at said first fiber Bragg grating to said slow principal axis becomes parallel to said fast principal axis at said second fiber Bragg grating.

101. The method as in claim 97, further comprising connecting said first and said second fiber Bragg gratings at two different locations in a dispersive fiber so that said first output signal transmits through a portion of the dispersive fiber before entry of said second fiber Bragg grating.

102. The method as in claim 97, further comprising connecting said first and said second fiber Bragg gratings at the same location in a dispersive fiber so that said first output signal is directly coupled into said second fiber Bragg grating.

103. The method as in claim 97, wherein at least one of said first and said second fiber Bragg gratings has a grating pattern spatially chirped as a nonlinear function of a position along said fiber Bragg grating.

104. The device as in claim 97, wherein said first fiber Bragg grating is tunable, said second fiber Bragg grating is not tunable but is pre-stretched by a fixed amount so that said first fiber Bragg grating is stretched to increase said net grating dispersion and is compressed to decrease said net grating dispersion.

105. The method as in claim 97, wherein both said first and said second fiber Bragg gratings together are tunable, and further comprising changing said length of said first fiber Bragg grating opposite to a change in said length of said second fiber Brag grating.

106. The method as in claim 97, wherein at least one of said first and said second fiber Bragg gratings is configured to have a grating pattern which has a constant grating period and a spatially-changing grating strength along said fiber Bragg grating.

107. The device as in claim 97, wherein at least one of said first and said second fiber Bragg gratings is configured to have a grating pattern which has a constant grating period and a spatially-changing grating strength along said fiber Bragg grating.

108. The device as in claim 97, wherein at least one of said first and said second fiber Bragg gratings is configured to have a grating pattern which has a constant grating period and a spatially-changing shift of a phase of a grating pattern along said fiber Bragg grating.

109. The device as in claim 97, wherein said first fiber Bragg grating has a nonlinearly-chirped grating period and is fixed to produce a constant nonlinear group delay and said second fiber Bragg grating has a constant grating period and is tunable to produce a tunable nonlinear group delay, and wherein tuning of said second fiber Bragg grating tunes said net grating dispersion.

110. The device as in claim 97, wherein each fiber Bragg grating is configured to produce a constant dispersion independent of a wavelength of reflected light and a linear dispersion as a linear function of a wavelength of reflected light, wherein said linear dispersion of said first fiber Bragg grating has a sign opposite to a sign of said linear dispersion of said second fiber Bragg grating.

111. The method as in claim 97, wherein one of said first and said second fiber Bragg gratings is controlled to tune a nonlinear group delay in its output while the other fiber Bragg grating is not tuned and is fixed to produce a constant nonlinear group delay.

* * * * *